Sept. 8, 1942.                 O. H. CALLICOTT                    2,295,027
                          CUT-OFF DIE FOR CAKE DROPPERS
                             Filed Oct. 24, 1940          2 Sheets-Sheet 1
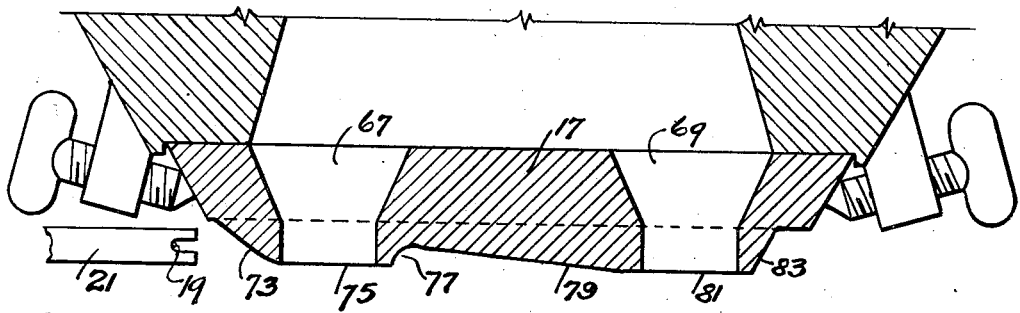
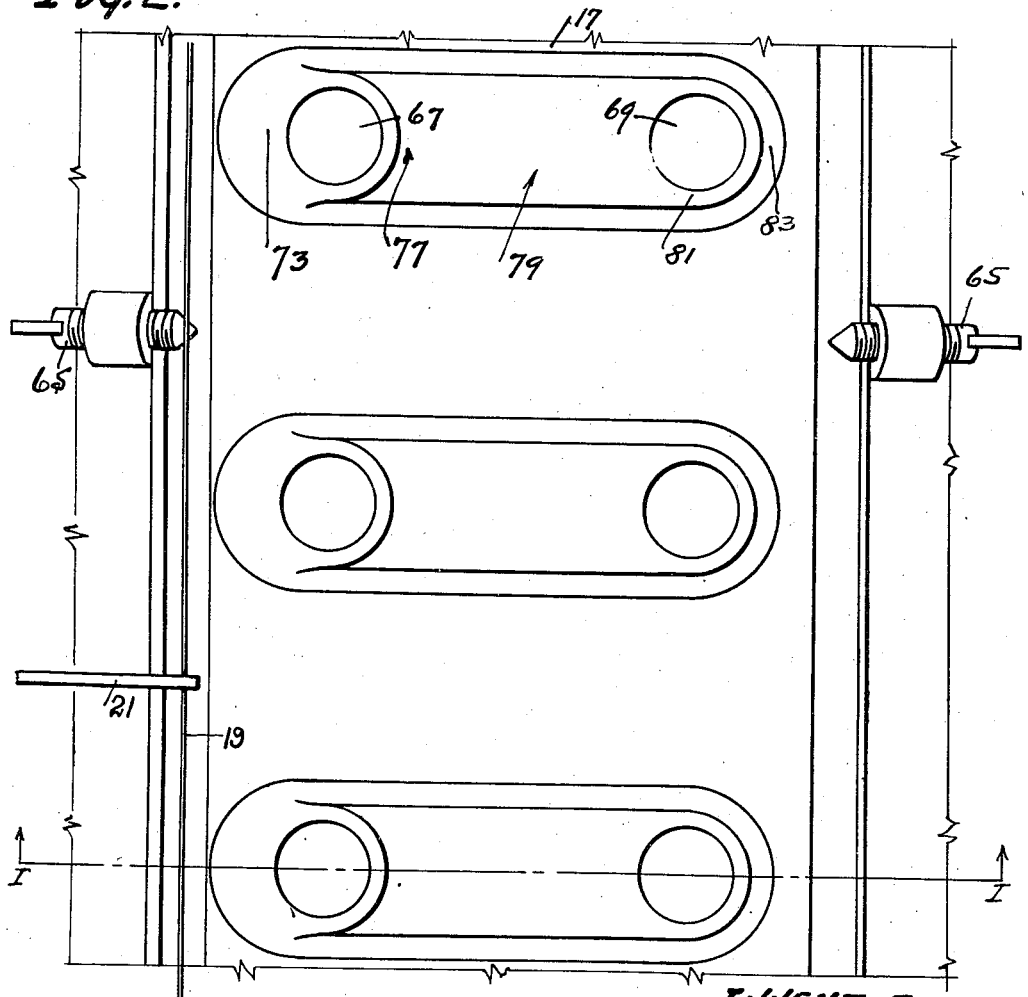
INVENTOR
OAKLEY H. CALLICOTT
By J. H. Weatherford
Atty.

Sept. 8, 1942.　　O. H. CALLICOTT　　2,295,027
CUT-OFF DIE FOR CAKE DROPPERS
Filed Oct. 24, 1940　　2 Sheets-Sheet 2
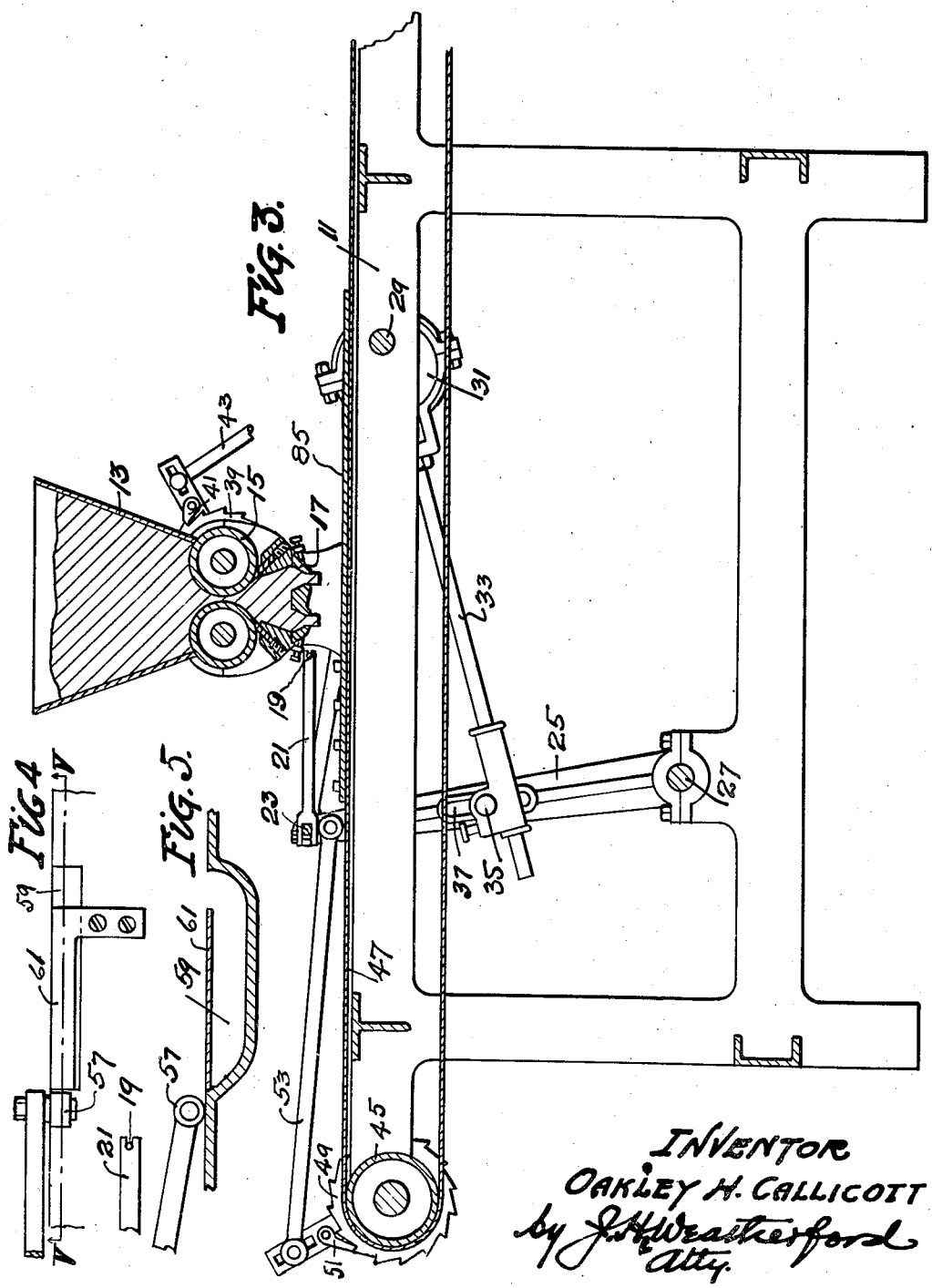
INVENTOR
OAKLEY H. CALLICOTT
by J.H.Weatherford
Atty.

Patented Sept. 8, 1942

2,295,027

UNITED STATES PATENT OFFICE 2,295,027

CUTOFF DIE FOR CAKE DROPPERS

Oakley H. Callicott, Memphis, Tenn.

Application October 24, 1940, Serial No. 362,517

2 Claims. (Cl. 107—29)

This invention relates to that class of machines in which the cake dough is placed in a hopper and extruded by rolls through a die plate and the extruding masses are cut off and dropped on to pans or plates ready for baking.

In such mechanisms it is well known to make use of an elongated hopper having therebelow a die with a plurality of extrusion openings alined in the direction of the length of the hopper, and to effect the cut-off by means of a fine tightly stretched wire reciprocated against the under face of the die in manner to effect simultaneous cut-off at all the openings, and for larger size cakes such mechanism has proved satisfactory.

Such machines, however, are of inadequate cut-off capacity where small size cakes are concerned, both in output and relatively to the amount of dough which may be extruded, and numerous attempts have been made to duplicate the rows of cut-off holes and thereby double the cut-off capacity. Such attempts, however, have largely proved infeasible in that they depended on the drop of the cut-off wire at the end of the stroke to disengage the wire from the dough and no such drop being available between holes, there was displacement of the first row of cakes in the direction of the line of cut-off stroke and a piling up of the second row on the first, or at least a crowding of the second row with relation to the first, either of which eventualities fatally interferes with the subsequent formation of the cakes, due to rising, during baking.

The objects of the invention are:

To provide an efficient construction of die whereby plural cut-off may be accomplished at a single stroke of the mechanism, and cut-off wire release be accomplished; and To provide simple and efficient means by which the die plate may be readily positioned and attached to the hopper and as readily removed, as for substitution of a different die.

The means by which the foregoing and other objects are accomplished and the method of their accomplishment will readily be understood from the following specification upon reference to the accompanying drawings, in which:

Fig. 1 is a transverse section of the die taken transversely to the length of the die and through one pair of the extruding holes, the die being shown attached to a fragmentary portion of the hopper.

Fig. 2 is an inverted plan view of a fragmentary portion of the die in place.

Fig. 3 is a transverse sectional elevation showing essential features of the machine as a whole.

Fig. 4 is a fragmentary plan view of a fragmentary portion of the cut-off trip; and Fig. 5 a corresponding fragmentary sectional elevation taken on the line V—V of Fig. 4, both views being relatively enlarged with respect to Fig. 3.

Referring now to the drawings in which the various parts are indicated by numerals:

The machine includes a frame 11 which supports a hopper 13 having rolls 15 which are rotated to force the dough through a die plate 17. The material extruded through the die plate is cut off by a fine wire 19 which is stretched over arms 21 forming part of a carrier. The arms 21 are mounted on a transverse bar 23, preferably of square cross section, to prevent turning movement of the arms thereabout. The bar is oscillatably carried by the free ends of a pair of arms 25 disposed on opposite sides of the frame, the arms being oscillatably secured to the frame as by pins 27. Journalled in the frame is a transverse shaft 29 which is driven in manner usual to such machines by suitable power mechanism, not here shown.

Secured on the shaft is an eccentric 31 which is connected by suitable straps, and pitman rod 33 to the arms 25, the connection to the arms 25 being through the usual pins 35, which are preferably slidably adjustable as in slots 37 extending along the members 25, this adjustment being used to vary the stroke of the cut-off wire.

The rolls 15 are preferably operated with a step by step motion as by a ratchet wheel 39 and a pawl 41, which may be oscillated as through a connecting rod 43, shown extending toward the shaft 29, and which may be driven as through a second eccentric, not shown.

Mounted on the opposite ends of the frame are rollers 45, only one of which is shown, which rollers drive a belt 47, one set of the rollers being advanced with a step by step motion, as by a ratchet wheel 49 and pawl 51, which pawl may be advanced and retracted as through a link 53, which may conveniently be reciprocated by the arm 25.

The bar 23 also carries an arm 55 which has a roller 57 cooperating with a well known type of shuttle device having a channel 59 in which the roller 57 travels on its return stroke and a plate 61 overlying the channel, which plate provides a guide to support the roller 57 in its forward movement and establishes a rectilinear path for the ends of the arms 21 and the wire 19 supported thereby.

The die plate 17 is removably secured in place against the bottom edge of the hopper 13 as by screws 65, four of these screws ordinarily being used, though only two thereof appear in the instant drawings.

Each plate is provided with rows of holes, 67, 69 respectively, two rows only being shown, the rows being disposed parallel to the length of the hopper 13. Transversely the holes are alined and each transverse group of holes is surrounded by a boss extending correspondingly across the die. Each boss has an approach edge 73, a cut-off portion 75 across the hole 67; a sharp drop-off 77 immediately adjacent the departure edge of the hole, an elongated approach portion 79 to the hole 69, a cut-off portion 81 across the hole 69, and a sharp drop-off portion 83 adjacent the departure edge of that hole.

85 is a pan disposed on the belt 47 and advanced with step by step movement by such belt. Empty pans are successively placed on the belt in abutting relation with preceding pans and pans as filled are removed and placed in the oven.

In setting up the machine the stroke of the ratchet pawl 41 which operates the feed rolls 15 is coordinated to advance the rolls during the retraction stroke of the cut-off wire and the advance movement of the belt 47. The hopper is filled with dough and the machine started. Dough is forced by the rolls 15 through the die plate 17 and as the feed advancement of the rolls stops the cut-off wire 19 moves toward the die plate. In this movement it strikes the approach edges 73 of the bosses on the die plate and is downwardly deflected to underlie the faces 75 at which the holes 67 terminate. The wire slides across this face cutting off the extended dough, drops abruptly at the departure edge 77 of the hole, jerking loose from the dough cut off; thence immediately engages the elongated approach portion 79 to the hole 69, passes across the cut-off portion 81 of that hole cutting off the extended dough, and again abruptly drops at the departure edge 83 of the boss. Subsequently the wire shortly completes its stroke, reverses and as the reverse occurs is dropped by the shuttle device to clear the die on the return stroke.

It will particularly be noted that as the wire engages the approach edge 73 it is just beginning its cut-off stroke and its motion is slow, whereas this motion increases rapidly between the holes and it is found that a long gentle approach is of great advantage in preventing breaking of the wire incident to engagement with an abrupt approach at such speed.

In the cut-off movement the abrupt drop-off as the wire passes each hole, even though such drop-off be extremely small, gives a dislodging action which frees the dough and allows it to drop downward, the dough dropping with small deviation from a vertical path, directly upon the baking pan or plate therebelow. As the wire completes its cut-off stroke the advancement of the belt by the ratchet wheel 49 and pawl 51 is begun and the plate on the belt shifted to a position to receive an additional pair of rows.

Only two rows of holes are here shown, but it will be distinctly understood that if the die plate be of sufficient width to permit, an additional row, or rows, of holes might be added, but that each such hole must have an abrupt drop-off and that each such hole after the first row of holes should preferably have a long easy approach surface.

I claim:

1. In a cake dropper of the type which includes dough holding and extruding means, a plate, carried by said holding means, having extrusion holes arranged in parallel longitudinal, and parallel transverse, rows, a cutting wire disposed in longitudinal alinement with said longitudinal rows and means for traversing said wire across said plate; a said cutting wire which is mounted for movement in a plane spaced below and in substantial parallelism with said plate; a said plate which has substantially identical transverse ribs, one for each said transverse row of holes, said ribs extending below said plate, being apertured in alinement with said holes and having cutting surfaces, each respectively around a said hole, said cutting surfaces lying equally below and in parallelism with the plane of movement of said wire, said ribs each having for each said hole an inclined approach surface initiating above the path of said wire and leading gently downward to its respective said cutting surface, and an abrupt departure surface terminating above said path, said ribs removing the field of action of said wire from said plate whereby to prevent contact of said wire with said plate, allow free departure drop, and substantially reduce interfering frictional drag.

2. In a cake dropper of the type which includes dough holding means, a plate having extrusion holes arranged in parallel rows longitudinally and transversely disposed, means for extruding dough through said holes, cutter means including a wire stretched in substantial parallelism with said longitudinal rows and carried for movement transverse thereto, and means for traversing said wire across said plate; a said cutting wire which is mounted for movement in a plane spaced from and substantially parallel to the under surface of said plate, transversely disposed ribs extending downward from the under surface of said plate, each respectively surrounding a said transversely disposed row of holes, each of said ribs including cutting surfaces, respectively around said holes, and an approach surface and a departure surface for each said cutting surface, said cutting surfaces projecting equally below the plane of movement of said wire and lying parallel to said plane, said approach surfaces having their approach ends lying above said plane and inclining downward each to a smooth junction with said cutting surface, and said departure surfaces extending abruptly upward each from a said cutting surface in adjacency to said holes, said ribs removing the field of action of said cutting wire from said plate.

OAKLEY H. CALLICOTT.